US005742907A

United States Patent [19]

Brown

[11] Patent Number: 5,742,907

[45] Date of Patent: Apr. 21, 1998

[54] AUTOMATIC CLEAR VOICE AND LAND-LINE BACKUP ALIGNMENT FOR SIMULCAST SYSTEM

[75] Inventor: Thomas A. Brown, Lynchburg, Va.

[73] Assignee: Ericsson Inc., Research Triangle Park, N.C.

[21] Appl. No.: 504,390

[22] Filed: Jul. 19, 1995

[51] Int. Cl.[6] .................................. H04B 1/00; H04B 7/00

[52] U.S. Cl. .................................. 455/503; 455/8; 455/507

[58] Field of Search .................................. 455/51.1, 51.2, 455/53.1, 49.1, 56.1, 57.1, 8, 67.1, 502, 503, 507, 500, 524, 526; 375/356, 375, 364, 365; 370/216, 316, 503

[56] References Cited

U.S. PATENT DOCUMENTS 3,879,664 4/1975 Monsen .
3,902,161 8/1975 Kiowaski et al. .
4,218,654 8/1980 Ogawa et al. .
4,255,815 3/1981 Osborn .
4,317,220 2/1982 Martin .
4,328,585 5/1982 Monsen .
4,411,007 10/1983 Rodman et al. .
4,414,661 11/1983 Karlstom .
4,472,802 9/1984 Pin et al. .
4,475,246 10/1984 Batlivala et al. .
4,516,269 5/1985 Krinock .
4,570,265 2/1986 Thro .
4,578,815 3/1986 Persinotti .
4,597,105 6/1986 Freeburg .
4,608,699 8/1986 Batlivala et al. .
4,696,051 9/1987 Breeden .
4,696,052 9/1987 Breeden .
4,718,109 1/1988 Breeden .
4,769,825 9/1988 Vogel .
4,782,499 11/1988 Clendening .
4,850,032 7/1989 Freeburg .
4,873,683 10/1989 Borth .

(List continued on next page.)

FOREIGN PATENT DOCUMENTS 0 486 299 5/1992 European Pat. Off. .
0 515 214 11/1992 European Pat. Off. .
0 551 214 7/1993 European Pat. Off. .
61-107826 5/1986 Japan .
WO 92 13417 8/1992 WIPO .

*Primary Examiner*—Chi H. Pham
*Assistant Examiner*—Gertrude Arthur
*Attorney, Agent, or Firm*—Nixon & Vanderhye P.C.

[57] ABSTRACT

In a multiple site radio frequency (RF) simulcasting transmission system, voice and digital data distributed via multiphase modem over "land-line" inter-site communication links from a control point to the RF transmitter sites exhibit random time delay skew because the modems at each site recover clock signals from an arbitrary one of multiple phases. Reference "tones" for data alignment, consisting of a high frequency clocking signal and a low frequency "gating" signal, are generated at each site synchronized to a GPS broadcast reference signal. Similar tones are also provided to transmitter sites along with the distributed data via the land-line inter-site communication links as a backup. The pair of "backup" reference tones supplied via land-line are automatically aligned at each site to the GPS receiver generated reference tones by individual phase comparison and dynamically-adjusting delay circuits. Consequently, sites can compensate for any land-line path re-routing—so long as the GPS system is operational. In the event of GPS receiver failure or loss of GPS signal lock a delay adjustment inhibit feature is provided to preserve the most recent and accurate delay setting. A site switches over to the land-line backup reference tones once a maximum "free-running" tolerance time limit for the GPS receiver reference tone generator has been exceeded. In an alternate embodiment, backup reference tone phase comparison is coupled with a circuit for adjustably delaying a composite inter-site link T1-type channel signal. This arrangement automatically aligns the backup reference tones to match analog voice data ("clear voice") signal path latency.

12 Claims, 6 Drawing Sheets

U.S. PATENT DOCUMENTS

| | | | |
|---|---|---|---|
| 4,890,298 | 12/1989 | Galpin . | |
| 4,903,262 | 2/1990 | Dissosway et al. . | |
| 4,903,321 | 2/1990 | Hall et al. . | |
| 4,918,437 | 4/1990 | Jasinski et al. . | |
| 4,926,496 | 5/1990 | Cole et al. . | |
| 4,939,746 | 7/1990 | Childress . | |
| 4,968,966 | 11/1990 | Jasinski et al. . | |
| 4,972,410 | 11/1990 | Cohen et al. . | |
| 5,003,617 | 3/1991 | Epsom et al. . | |
| 5,014,344 | 5/1991 | Goldberg . | |
| 5,046,128 | 9/1991 | Bennett . | |
| 5,052,028 | 9/1991 | Zwack . | |
| 5,127,025 | 6/1992 | Okanoue . | |
| 5,127,101 | 6/1992 | Rose, Jr. . | |
| 5,142,551 | 8/1992 | Borth et al. . | |
| 5,146,585 | 9/1992 | Smith, III | 370/503 |
| 5,155,859 | 10/1992 | Harris et al. . | |
| 5,172,396 | 12/1992 | Rose et al. . | |
| 5,203,027 | 4/1993 | Noumin et al. . | |
| 5,218,717 | 6/1993 | Reitberger | 455/51.2 |
| 5,245,634 | 9/1993 | Averbuch . | |
| 5,263,177 | 11/1993 | Schieve et al. | 455/51.2 |
| 5,271,042 | 12/1993 | Borth et al. . | |
| 5,280,629 | 1/1994 | Lo Galbo et al. | 455/51.2 |
| 5,287,550 | 2/1994 | Fennell et al. . | |
| 5,353,307 | 10/1994 | Lester . | |
| 5,398,263 | 3/1995 | Vanderspoll, II et al. | 455/51.2 |
| 5,416,808 | 5/1995 | Witsaman et al. | 455/51.2 |
| 5,477,539 | 12/1995 | Brown | 455/51.2 |

AUTOMATIC CLEAR VOICE AND LAND-LINE BACKUP ALIGNMENT FOR SIMULCAST SYSTEM

CROSS-REFERENCES TO RELATED APPLICATIONS AND PATENTS

This application is somewhat related to commonly-assigned U.S. Pat. No. 5,172,396 to Rose et al., issued on Dec. 15, 1992, entitled "Public Service Trunking Simulcast System," and U.S. Pat. No. 5,127,101 to Rose, Jr., issued Jun. 30, 1992, entitled "Simulcast Auto Alignment System." This application is also somewhat related to the following commonly-assigned copending applications: Ser. No. 07/824,123 of Brown et al. entitled "Self Correction of PST Simulcast System Timing", filed Jan. 22, 1992 (Attorney Docket Number 46-444; Client Reference No. 45-MR-644) and Ser. No. 08/364,467 of Brown et al. entitled "Simulcast Resynchronization Improvement Using GPS", filed Dec. 27, 1994 (Attorney Docket Number 46-790; Client Reference No. EL8475-RLMR). The disclosures of each of the above patents and applications are incorporated by reference as if expressly set forth herein.

FIELD OF THE INVENTION

This invention relates to radio frequency (RF) signal transmission systems, and in particular to "simulcasting" systems for providing the simultaneous transmission of the same information by two or more separately located RF transmitters. More particularly, the invention relates to an improved method and apparatus for automatic alignment of land-line analog voice and backup synchronization reference tones in a simulcast system.

BACKGROUND AND SUMMARY OF THE INVENTION

As is well known, due to FCC power limitations, geographical and/or other factors, it is sometimes not possible for a single RF transmitting site to provide adequate coverage to a large desired coverage area. For example, government entities commonly use land-mobile radio communications systems to provide communications between a headquarters and various mobile and portable radio users that rove throughout the jurisdiction of the governmental entity. In some cases the geographical area of jurisdiction is so large that it is not possible for a single land-based RF transmitting site to cover it. Even if the effective radiated power of the single transmission site was sufficiently great to cover the entire area, users in outlying or fringe areas might receive only spotty service because of the "line-of-site" nature of VHF transmissions and/or due to geographical obstructions (e.g., hills, bridges, buildings, and the curvature of the earth) interposed between the single transmitter site and various fringe locations within the coverage area.

One known way to expand the coverage area is to provide multiple, "simulcasting" transmitting sites. In order to simplify mobile radio operation and conserve radio frequency spectrum, such "simulcasting" RF transmitting sites all transmit substantially identical signals at substantially identical times on substantially identical radio frequencies. Such "simulcasting" eliminates control overhead and other complexities associated with performing "hand offs" from one RF transmitting site coverage area to another as is common, for example, in cellular and "multi-site" RF communications systems. So-called "simulcasting" digitally trunked RF repeater systems are generally known. The following is a listing (which is by no means exhaustive) of prior documents that describe various aspects of RF transmission simulcasting and related issues:

U.S. Pat. No. 5,172,396 to Rose et al.;
U.S. Pat. No. 4,903,321 to Hall et al.;
U.S. Pat. No. 4,696,052 to Breeden;
U.S. Pat. No. 4,696,051 to Breeden;
U.S. Pat. No. 4,718,109 to Breeden et al.
U.S. Pat. No. 5,245,634 to Averbuch;
U.S. Pat. No. 5,287,550 to Fennell et al;
U.S. Pat. No. 4,782,499 to Clendening;
U.S. Pat. No. 5,052,028 to Zwack;
U.S. Pat. No. 4,570,265 to Thro;
U.S. Pat. No. 4,516,269 to Krinock;
U.S. Pat. No. 4,475,246 to Batlivala et al.;
U.S. Pat. No. 4,317,220 to Martin;
U.S. Pat. No. 4,972,410 to Cohen et al.;
U.S. Pat. No. 4,608,699 to Batlivala et al.;
U.S. Pat. No. 4,918,437 to Jasinski et al.;
U.S. Pat. No. 4,578,815 to Persinotti;
U.S. Pat. No. 5,003,617 to Epsom et al.;
U.S. Pat. No. 4,939,746 to Childress;
U.S. Pat. No. 4,903,262 to Dissosway et al.;
U.S. Pat. No. 4,926,496 to Cole et al.;
U.S. Pat. No. 4,968,966 to Jasinski et al;
U.S. Pat. No. 3,902,161 to Kiowaski et al;
U.S. Pat. No. 4,218,654 to Ogawa et al;
U.S. Pat. No. 4,255,815 to Osborn;
U.S. Pat. No. 4,411,007 to Rodman et al;
U.S. Pat. No. 4,414,661 to Karlstrom;
U.S. Pat. No. 4,472,802 to Pin et al.;
U.S. Pat. No. 5,046,128 to Bennett;
U.S. Pat. No. 5,014,344 Goldberg;
U.S. Pat. No. 4,850,032 to Freeburg;
U.S. Pat. No. 4,597,105 to Freeburg; and
Japanese Patent Disclosure No. 61-107826.

U.S. Pat. No. 5,172,396, issued Dec. 15, 1992 to Rose et al., entitled "Public Service Trunking Simulcast System", discloses a trunked radio simulcast system having control site and remote site architectures that include RF transmission timing synchronization features that are relevant to the presently preferred embodiment. In addition, U.S. Pat. No. 4,903,321, issued Feb. 20, 1990 to Hall et al., entitled "Radio Trunking Fault Detection System," discloses a trunked radio repeater system having a radio frequency repeater site architecture that includes fault and call testing and failure detection features that are somewhat relevant to the present invention. These patents are both commonly assigned to the assignee of the present invention and are both incorporated by reference herein.

While simulcasting thus provides various advantages as compared to other techniques for expanding coverage area, it also introduces its own particular set of complexities that must be dealt with. By way of illustration, please refer to FIG. 1—which is an illustrative schematic diagram of a three-site simulcasting digitally trunked land-mobile RF communications system 10. System 10 includes three simulcasting transmitting sites, S1, S2 and S3. The transmissions of site S1 cover the coverage area A1, and similarly, the transmissions of sites S2 and S3 cover respective coverage areas A2, A3. A central control point C coupled to each of sites S1, S2 and S3 via respective communication links (L1–L3) delivers, in real time, substantially identical signalling (including digital control channel signalling and associated timing information) for transmission by the various sites.

Each RF channel at all sites is modulated with amplitude, phase and time delay corrected information. To accomplish this, time, phase and amplitude stable communication links must be provided between a main control point site and all other simulcast transmit sites by means of a high quality phase-stable back-bone communication system arrangement (e.g., radio, microwave or fiber optic). In this regard, commercial wire-common-carriers do not provide the degree of stability required for simulcast; whereas, dedicated, user controlled, voice/data grade, synchronous multiplex used in conjunction with radio, microwave or fiber optic back-bone distribution paths most effectively do provide the needed communications circuits and stability for simulcast.

Simulcast system 10 is preferably a digitally trunked simulcast communications system of the type marketed by Ericsson, Inc. under the trade name EDACS. This system provides a digital RF control channel and plural RF working channels. In such a digitally trunked system, a mobile radio unit M within one (or more) of coverage areas A1–A3 continuously monitors an "outbound" digital control channel when it is not actually engaged in active communications on a working channel with other units. Mobile M may request communications by transmitting a channel assignment request message on an "inbound" control channel. Upon receipt of such channel assignment request (and presuming that at least one working channel is available for temporary assignment to mobile unit M and other units with which mobile unit M wishes to communicate), control point C responds by causing a control channel assignment message to be transmitted by each site S1–S3 over the outbound control channel. In simulcast system 10, this channel assignment message is transmitted simultaneously by each of transmitting sites S1–S3 over the same outbound control channel frequency (such that mobile unit M and other mobile units "called" by the channel assignment message will receive the message regardless within which coverage areas A1–A3 they may happen to be located). Mobile unit M (and other called mobile units) respond to the received outbound trunking control channel assignment message by changing frequency to an RF working channel and conducting communications on the working channel. Once the working channel communications are concluded, the mobile unit M (and other called mobile units) return to monitoring the outbound control channel for additional messages directed to them.

Referring once again to FIG. 1, suppose mobile unit M is located within an overlap area X wherein coverage areas A2 and A3 overlap one another. Within this overlap area X, mobile unit M will receive (perhaps at approximately equal signal strength levels) the outbound control channel transmission of site S2 and also the outbound control channel transmission of site S3. Simulcast system 10 is appropriately designed such that such outbound control channel transmissions from sites S2 and S3 are on substantially the same RF frequency so that no heterodyning or other interference occurs. Similarly, control point C sends, over links L1–L3, substantially identical outbound control channel messages for transmission by each of sites S1–S3.

However, a problem can arise if the outbound control channels are not precisely synchronized to one another. A transceiver located within overlap region X that receives outbound control channel synchronization signals delayed with respect to one another by even a small time period (e.g., more than a one-half bit period, or about 52 microseconds for 9600 baud operation) could end up losing bits and/or temporarily losing synchronization, bit recovery and error checking capabilities.

Delays due to the limited speed at which electromagnetic waves propagate must be taken into account in systems simulcasting data at high data transmission rates (an RF signal travels "only" about 300 meters in one microsecond). It is possible (and usually necessary) to adjust the relative effective radiated power levels of the site transmitters so that the distances across the overlap regions X are kept less than a desired maximum distance—and thus, the difference in the RF propagation delay times across an overlap region due to the different RF path lengths between the site and a receiver within the overlap region is minimized. Even with this optimization, however, it has been found that (due to the additional differential delay caused by the different RF path lengths) a maximum system differential delay stability of ±5 microseconds must be observed to guarantee that the transceiver in any arbitrary location within a typical overlap region X will receive the corresponding digital signal bit edges within 52 microseconds of one another.

Fortunately, it is typically possible to minimize time delay differences to on the order of a microsecond through various known techniques. For example, it is well known in the art to introduce adjustable delay networks (and phase equalization networks) in line with some or all of inter-site links L1–L3 to compensate for inherent differential link delay times (see U.S. Pat. No. 4,516,269 to Krinock, and U.S. Pat. Nos. 4,696,051 and 4,696,052 to Breeden, for example). Conventional microwave and fiberoptic link channels exhibit amplitude, phase and delay characteristics that are extremely stable over long periods of time (e.g., many months), so that such additional delays, once adjusted, guarantee that a signal input into all of the inter-site links L1–L3 at the same time will arrive at the other ends of the links at almost exactly the same time. The same or additional delays can be used to compensate for different, constant delay times introduced by signal processing equipment at the sites S1–S3 to provide simultaneous coherent transmission of the signals by the different sites. For example, the above-identified Rose et al. patent application describes a technique wherein additional frequency and timing information is provided to each site over one or more particular inter-site link channels so as to eliminate timing ambiguities that may result from the use of conventional multi-level, multi-phase protocol-type modems. In this manner, the above mentioned simulcast system forces coherence at the start of data transmission on a particular established communications path, thus correcting for any multi-bit ambiguity created by the inter-site communication link modem.

A more detailed description continues now with reference to FIG. 2, which generally depicts an Ericsson, Inc. multiple site simulcast transmission system of the type described in accordance with the above mentioned Rose et al. and Brown et al. patents. Channel transmitting circuit 100 located at control point site C sends a pair of simulcast system timing reference signals ("tones") to each transmit site (S1–S2) on a dedicated stable T1-type channel over the inter-site communication links (L1–L2). High speed digital data aligned to these reference signals is also sent via the communication links (L1–L2) between control point C and the transmit sites (S1–S2). A lower (e.g., 300 Hz) "tone" is used as a "gating" reference for read-out timing of a broadcast data buffer at the transmit sites and a higher (e.g., 2400 Hz) "tone" is used as a data clocking frequency reference. Each transmit site (S1–S2) in the simulcast system includes a "ReSynch" circuit for recovering reference edges from the tones. In performing a "ReSynch" operation the ReSynch circuit at each simulcast system site re-aligns the data received via the inter-site links to these reference edges. Resynchronizing of digital data is performed continually in this manner at each transmitter site in order to correct any control channel timing errors that may arise.

Enhanced Ericsson EDACS simulcast system architectures (See copending application Ser. No. 08/364,467 mentioned above) utilize a customized global positioning satellite (GPS) receiver at each transmitting site for providing access to a common timing reference. In this manner the GPS broadcasts serve as the main synchronization source for a precise local generation of the two frequency-stable reference "tones needed for "ReSynch" operations. The ReSynch circuit at each site utilizes the GPS derived reference signal tones to align the RF broadcasting of simulcast data. (The GPS system, traditionally used for navigational purposes, is a series of geosynchronous-orbit satellites that are synchronized in time and continuously transmit time, date and positioning information. Although, cellular radiotelephone system sites using GPS broadcasts for producing absolute timing are known, such systems admit to numerous inherent problems which render these systems expensive and unreliable. See, for example, the background discussion in U.S. Pat. No. 5,245,634 to Averbuch.) Conventionally in Ericsson, Inc.'s EDACS simulcast systems, the two reference tones were distributed to the sites over controlled land-line communications links. With the GPS enhancement the pair of land-line distributed reference tones were replaced by on-site (locally) generated tones derived from the GPS receiver units. In accordance with one important aspect of the present invention, a dedicated land-line link source of reference tones is retained (not replaced) and utilized as a "backup" source of simulcast system timing signals.

In Ericsson, Inc.'s EDACs simulcast systems three distinct type of information signals are distributed from a control point and controlled with the necessary precision required to provide simultaneous RF broadcasting at multiple spatially displaced transmission sites: (1) "Clear voice" (analog voice signals); (2) "low speed data"; and (3) "high speed data" (which could be digitally encrypted voice). Conventionally in Ericsson, Inc.'s EDACS simulcast systems, "clear voice" was communicated to/from the transmitting sites on a dedicated delay-corrected conventional FSK modem voice channel. Similarly, the "low speed data", which is common to all channels, was converted to a separate audio band signal and handled as another "clear voice" path to each site. In contrast, high speed data was communicated to/from the transmitter sites over a high-speed multi-phase modem channel at 9.6K baud (or greater) and appropriately corrected for the various RF transmission/multi-path delays by digital delay circuitry and synchronization circuitry at each site. Although the "ReSynch" circuit provided precise "high speed data" alignment, "clear voice" alignment was done separately and independently. In accordance with another important aspect of the present invention, the conventional EDACS simulcast system is significantly improved by altering the manner and arrangement by which "clear voice" (analog voice) is aligned, as discussed in greater detail in the detailed description of the drawings set forth below.

In summary of the present invention, "ReSynch" circuit reference tones are not only generated at each transmit site as synchronized with the control point by the GPS broadcasts, but are also sent to transmitter sites from the control point along with the system high speed digital data and clear voice data via the site interconnect links (L1, L2, etc.) as a "backup" reference tone source. Since each EDACS simulcast site includes a "ReSynch" circuit, simulcast data resynchronization is continually performed by each system site separately and independently. A stable precise 9600 Hz data clocking reference tone and a lower 300 Hz "gating" (timing) reference tone used by the ReSynch circuit (as described above) are generated at each simulcast system site synchronized to a GPS broadcast reference transmission. The control point site (C) is likewise synchronized to the GPS broadcasts but also provides a pair of reference tones over the land-line link to serve as a backup synchronization reference source in case of GPS broadcast outages or equipment failure. A "ReSynch" operation forces alignment of the high speed digital data to the correct simulcast system timing with the result that minor dynamic variations in site interconnect link latency are inherently corrected whenever a "ReSynch" operation is performed (so long as the latency variation is within the "gating" signal timing window)—and it is achieved without the need for any link latency measurement or monitoring.

More specifically in accordance with presently preferred embodiments of the invention, the land-line supplied "backup" reference tones are also automatically aligned at each site to the GPS receiver generated reference tones by individual phase comparison and dynamically adjusting delay circuits. Thus, the sites can track (compensate for) any land-line path re-routing—so long as the GPS system is operational. An adjustment inhibit feature is provided to "freeze" (preserve) the most current delay setting in the event of GPS system failure or loss of GPS signal lock. A switchover circuit is provided to switch the ReSynch circuit over to the land-line backup reference tones once a maximum "free-running" time tolerance limit for the site-local reference tone generator has been exceeded.

An alternate preferred embodiment in accordance with the present invention provides each site with phase comparison and a circuit for adjustably delaying the composite T1 channel signal. This provides the added benefit of automatically (inherently) aligning the backup reference tones to match the "clear voice" (analog voice) signal path latency over the landline link. Thus, the present invention provides such cumulative benefits as supplying and automatically aligning land-line backup reference tones, eliminating the need for conventional simulcast timing alignment hardware and manual alignment procedures, automatic tracking of any land-line path re-routing, and automatic aligning of "clear voice" signals.

BRIEF DESCRIPTION OF THE DRAWINGS

These and other features and advantages of the present invention will become more completely understood by referring to the following detailed description of presently preferred embodiments in conjunction with the FIGURES in which like reference numerals refer to like elements throughout.

DETAILED DESCRIPTION OF THE DRAWINGS

In the following description, for purposes of explanation and not limitation, particular details are set forth, such as general or specific schematic block diagrams of circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so not to obscure the description of the present invention with unnecessary detail.

Figure 1:
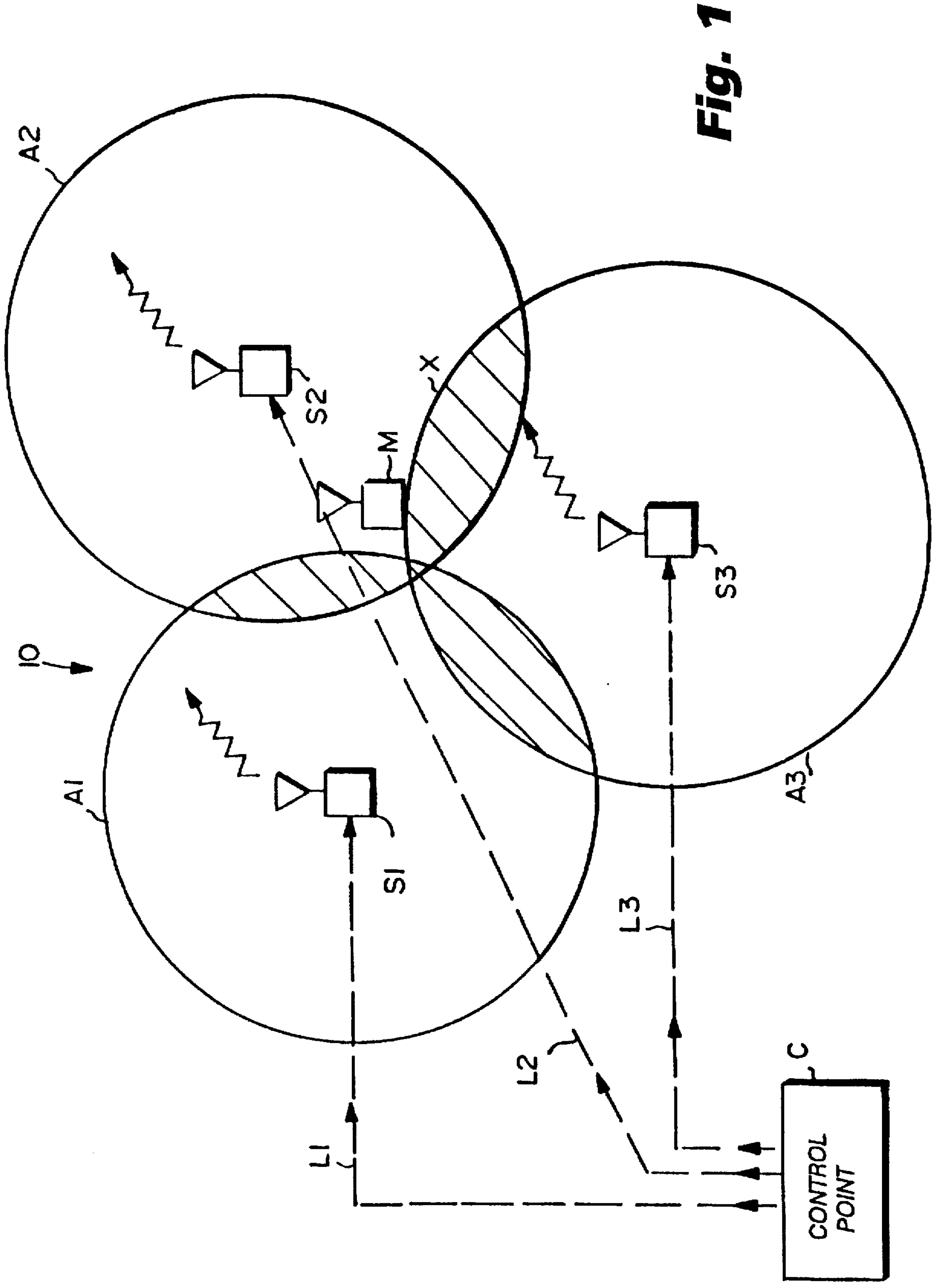
FIG. 1 is a diagrammatic illustration showing a simplified multiple site RF communication simulcast system.
Figure 2:
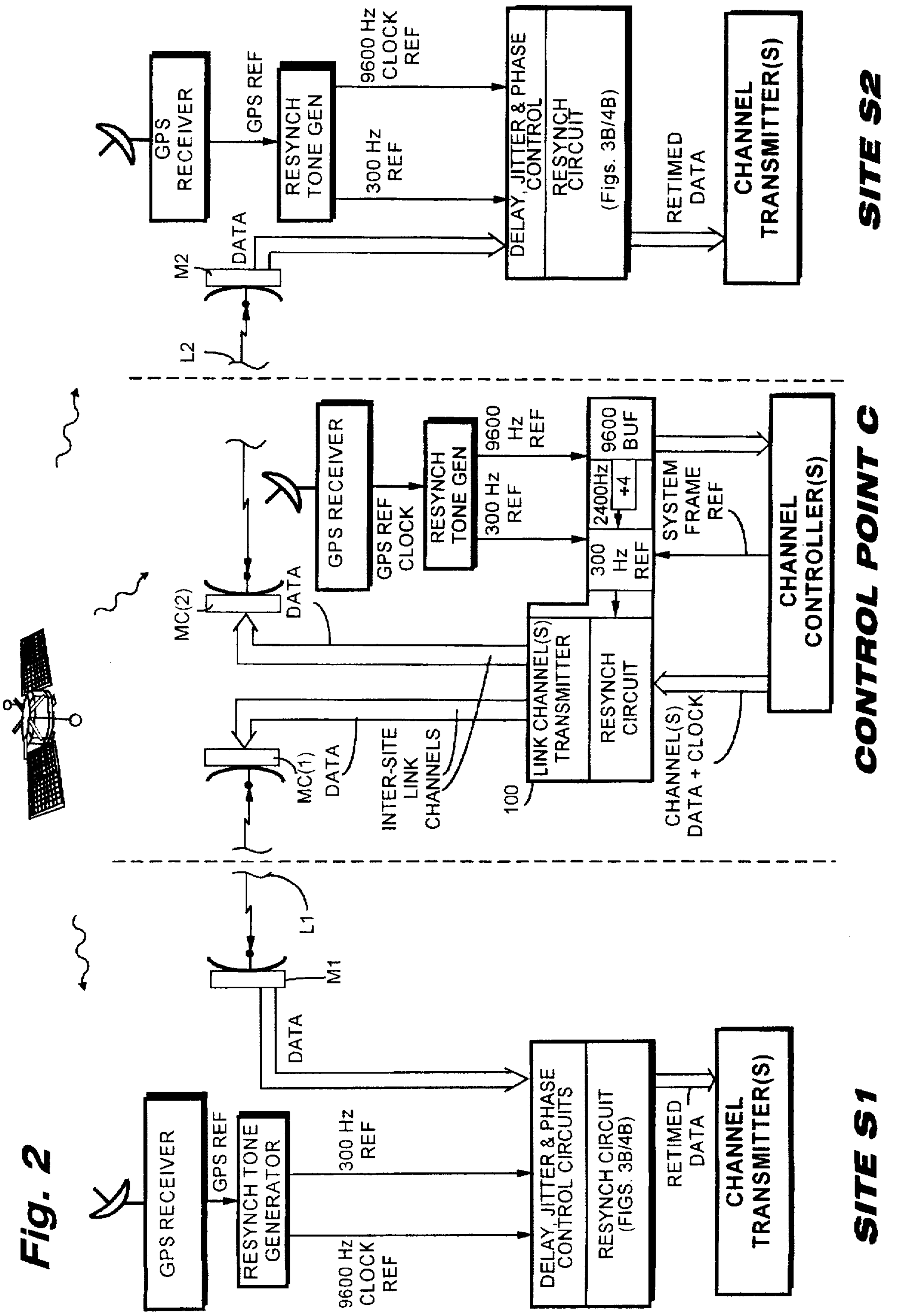
FIG. 2 is a schematic block diagram of a central control point (C) and remote transceiver sites (S1 and S2) of an Ericsson EDACS multiple site RF simulcast communication system of a type for which operation of the present invention may be particularly suited.

The basic architecture of an Ericsson, Inc. EDACS simulcast system as described above is shown in FIGS. 1 and 2—that is, it includes a central control point C and plural transmitting sites S1 . . . Sn. Although only two (remote) transmitting sites S1–S2 are shown in FIG. 2, it will be appreciated by one skilled in the art that numerous remote sites participating in simulcasting are likewise in communication with control point C via identical microwave, fiber-optic, cable or other land-line communication path links L1–Ln. Moreover, the present invention is not limited to use solely with T1-type microwave or hardwired land-line links but may be used with any other type of appropriate communication link such as radio wave.

In an EDACS simulcast transmission system, data provided via the inter-site communication links (L1, L2, etc.) from control point C to the RF transmitter sites (S1, S2, etc.) exhibits random time delay skew because multi-phase link modems (MC, M1, M2, etc.) at each site recover clock signals from an arbitrary one of multiple phases. The data stream outputs of the link modems are temporarily stored at the sites in memory buffers M1, M2, etc. associated with the link modem at each site. Timing information provided to each site from control point C via the inter-site link channels initially sets the memory buffer output timing at each site to eliminate transmission timing ambiguities. On a continual basis, "ReSynch" circuitry at the sites periodically resynchronizes the high speed digital data memory buffer output timing in accordance with a pair of reference frequency tones generated from a GPS broadcast. In accordance with the present invention, reference tones are also provided to each site over the dedicated link channels from control point C as a backup source, as discussed above.

Figure 3A:
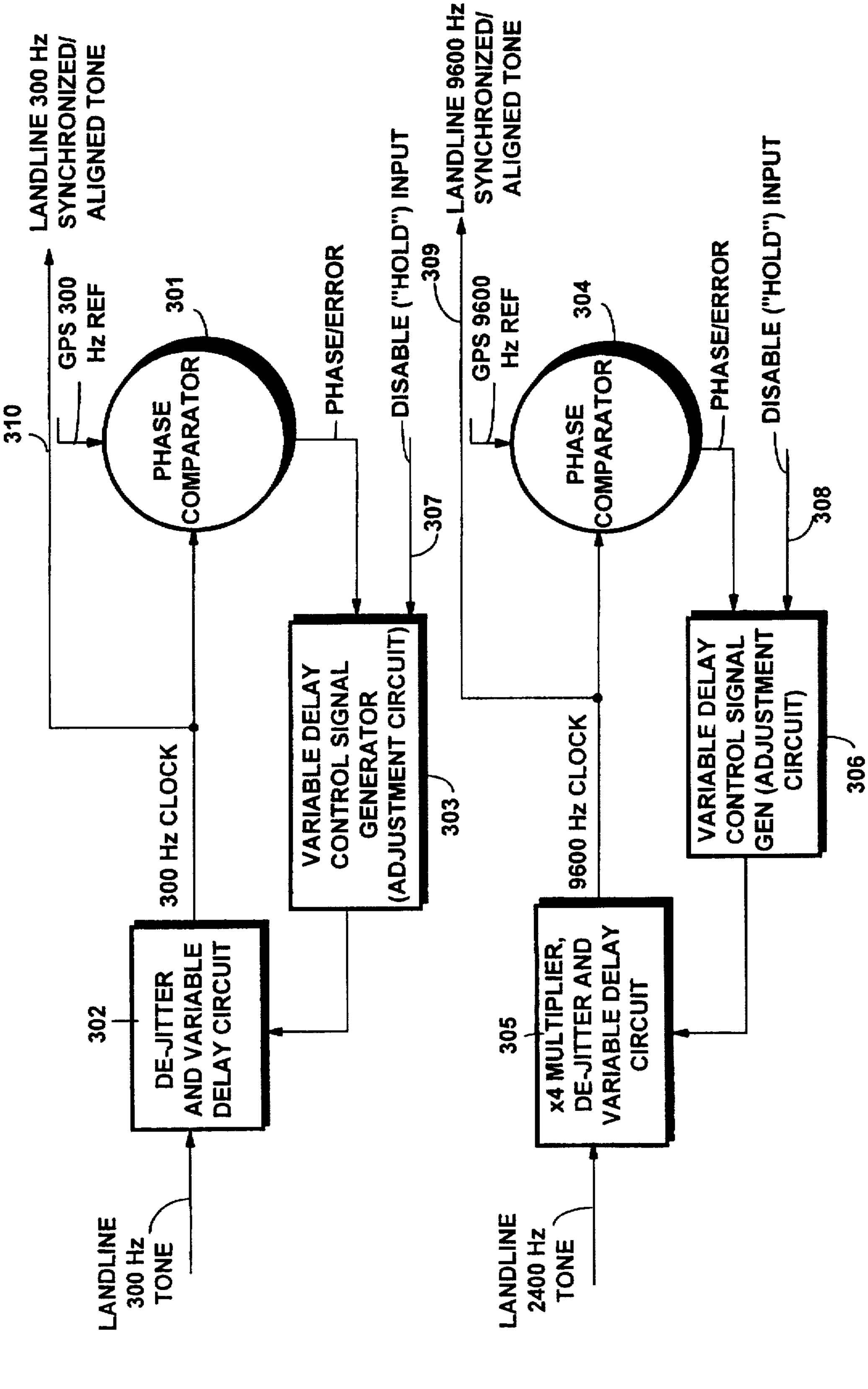
FIG. 3A is a block diagram illustrating phase comparison and dynamic delay adjustment circuitry for providing automatic alignment of individual land-line backup reference tones in accordance with the present invention.

In one preferred implementation of the present invention, referring now to FIG. 3A, a 300 Hz reference signal and a 9600 Hz reference signal (i.e., reference "tones") are derived from a GPS signal receiver (not shown) and are used as the preferred simulcast system absolute timing references. The land-line 300 Hz backup tone, following circuitry to remove jitter, is compared to the GPS synchronized 300 Hz tone using comparator 301 and then phase shifted using variable delay circuit 302 to reduce the phase difference to less than a desired acceptable tolerance (e.g., 3 μsec). Variable delay control signal generator 303 provides dynamic adjustment of variable delay circuit 302 based on the amount of phase error detected by comparators 301. Once the delay has been said to maintain a phase difference less than a desired tolerance, the delay setting (value) is held until the phase comparison indicates the difference has increased to greater than a second predetermined greater tolerance (e.g., 10 μsec).

As depicted in FIG. 3A, a similar technique is used to align a 9600 Hz reference tone that is multiplied-up from the land-line 2400 Hz backup tone and compared to the 9600 Hz GPS reference signal. A ×4-multiplier, de-jitter and variable delay circuitry 305 produces the 9600 Hz clock signal from the 2400 Hz land-line backup tone. Phase comparator 304 and variable delay control signal generator 306 are used to maintain a delay value that is preferably less than that used for aligning the 300 Hz tone (i.e., producing less than, for example, a 2 μsec phase difference). This delay value is held unless the comparison indicates the difference has increased above another predetermined threshold value (for example, to greater than 4 μsec). Accordingly, these two phase-locking tone alignment circuits of the present invention (i.e., those depicted as blocks 301–303 and 304–306 in FIG. 3A), function as automatic land-line link latency "tracking" circuits and can be continuously monitoring and adjusting alignment of the two land-line backup tones. However, since the land-line reference tones in the GPS reference signals start synchronized at the simulcast control point, following an initial system phase alignment, "tracking" per se will normally not be required until and unless the land-line inter-site link channel is re-routed and (consequently) changes its latency.

Figure 3B:
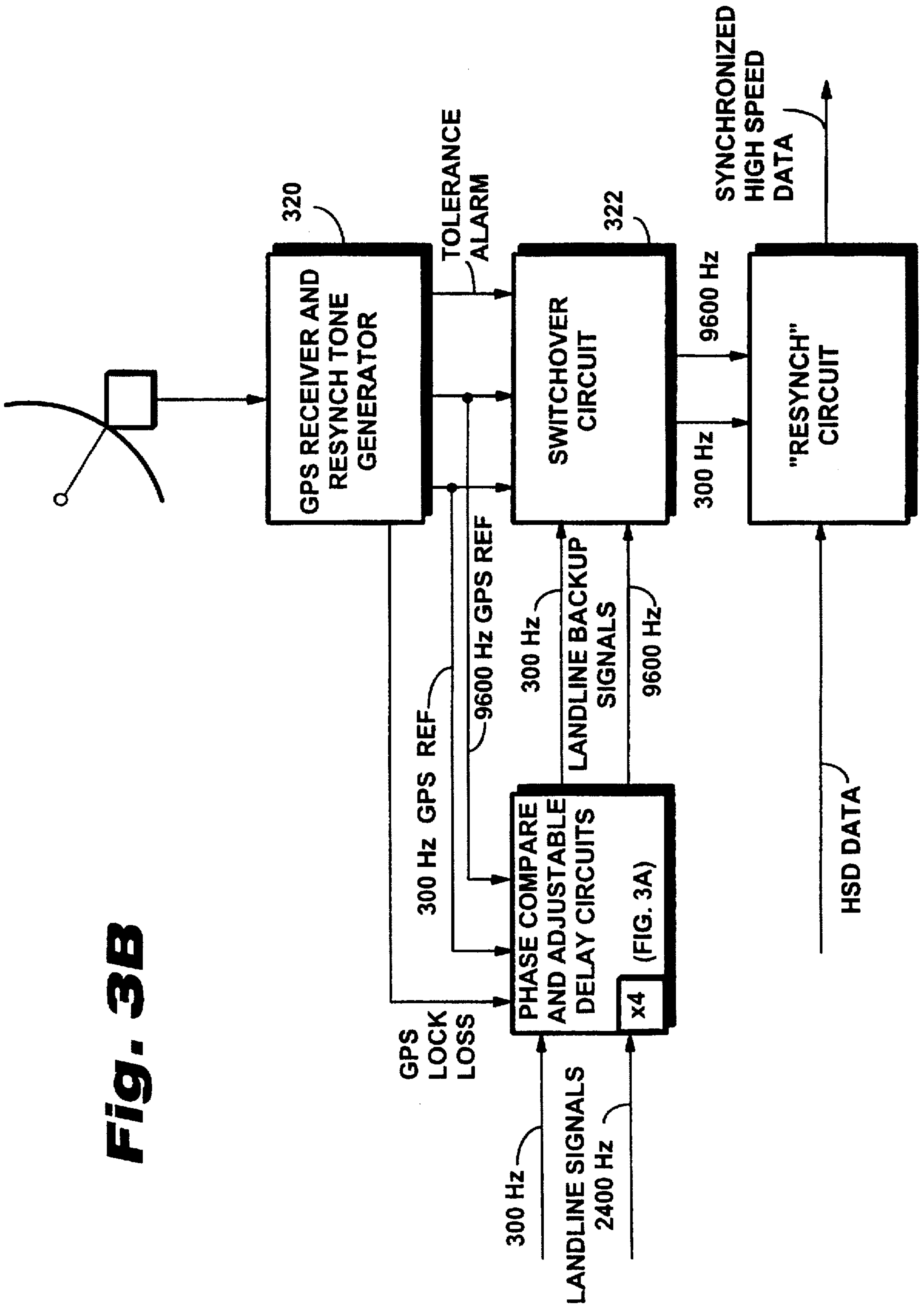
FIG. 3B is a block diagram illustrating an operating arrangement of the present invention for providing automatic alignment of land-line backup tones and automatic switchover of the ReSynch circuit to the land-line backup tones.

If the GPS receiver loses lock (or fails), the synchronized and aligned land-line backup reference tones 310 provided by the circuits of FIG. 3A would slowly start to drift and lose alignment. Therefore, variable delay control signal generator circuits 303 and 306 are responsive to a GPS lock "lost" signal on lines 307 and 308 to disable any further dynamic adjusting of variable delay circuits 302 and 305 under such conditions. The respective delay settings in circuits 302 and 305 consequently remain unchanged to preserve the last (and presumably most accurate) phase difference setting. Moreover, referring now to FIG. 3B, a "switchover" to the pair of land-line backup reference tones is designed to occur after the free-running tolerance time of the site reference tone generator 320 has been exceeded. In other words, after the oscillator in tone generator 320 has been "free-running" without being resynchronized to the GPS reference for an extended period of time, the present invention insures that the site will use the aligned backup reference tones in place of the tone generator reference tones (which are now no longer synchronized within desired the tolerance specifications). An acceptable duration of allowable oscillator "free-running" time is predetermined based on system factors such as the somewhat inferior precision of the land-line link channel backup reference tones, and how long it would take for a free-running tone generator circuit to drift below that lower threshold of precision.

Figure 4A:
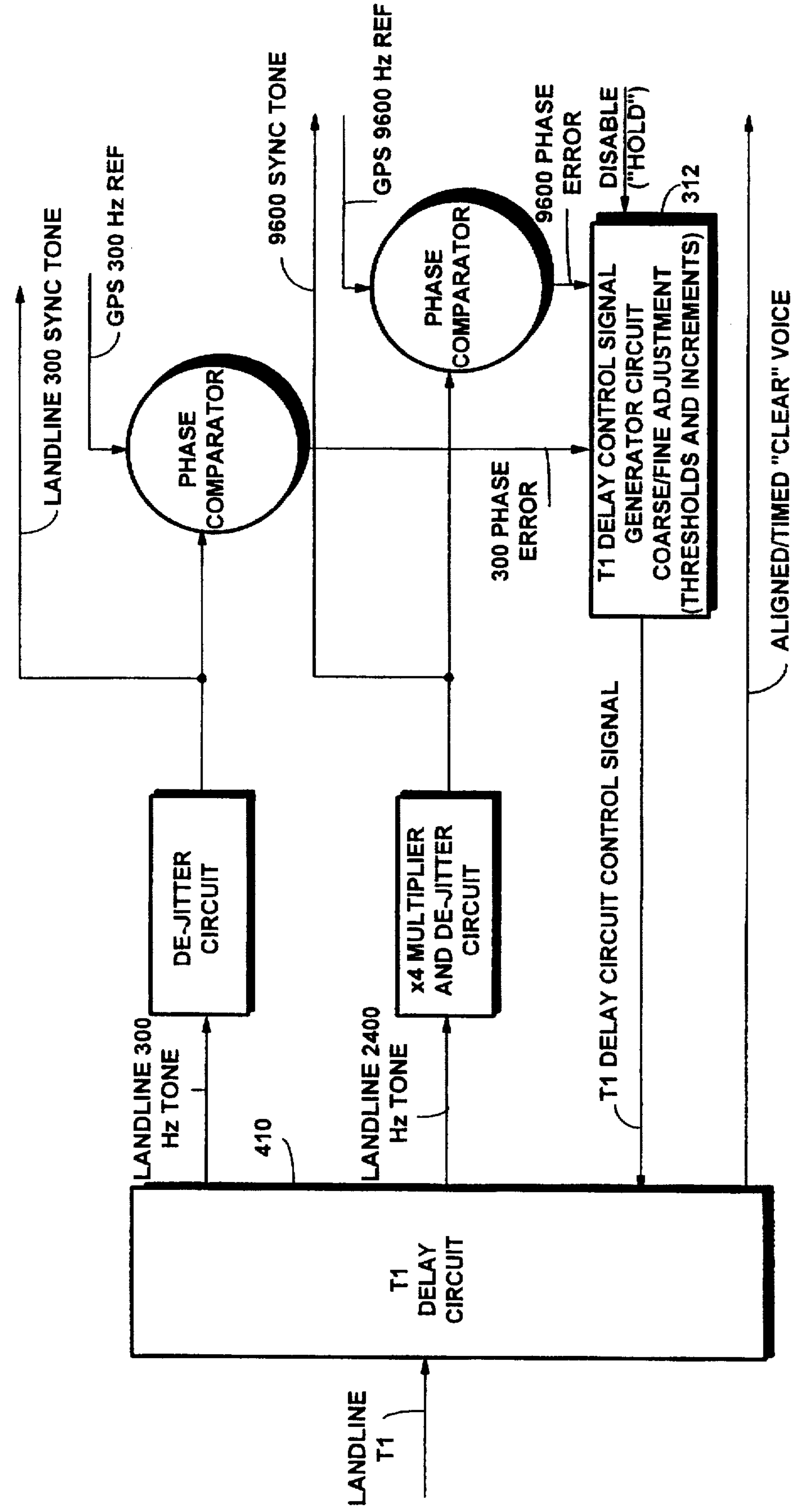
FIG. 4A is a block diagram illustrating the phase comparison and adjustable T1-channel delay control arrangement for providing automatic alignment of "clear voice" and land-line backup reference tones in accordance with an alternate embodiment of the present invention.

Referring to FIG. 4A, an alternate embodiment is disclosed which replaces the pair of variable delay phase locking circuits of FIG. 3A with a T1 channel signal variable delay circuit. Variable delay circuit 410 delays all T1 channel signals an identical amount. Since "jitter" on the 300 Hz reference tone (and the 300 Hz clock requirement) is larger than that for the 9600 Hz reference tone, the adjustment process to set the TI channel signal delay comprises an initial "course" delay adjustment, which moves the 300 Hz tone for to a "macro" phase alignment, and then a "fine" delay adjustment which aligns the 9600 Hz tone for a final setting. As above, there are two tolerance levels for adjustment—one that the phase is aligned within, and a larger phase difference phase value which initiates a readjustment. After initially aligning, the setting of this delay will normally not vary much—if at all—unless the land-line T1 link path has changed.

Figure 4B:
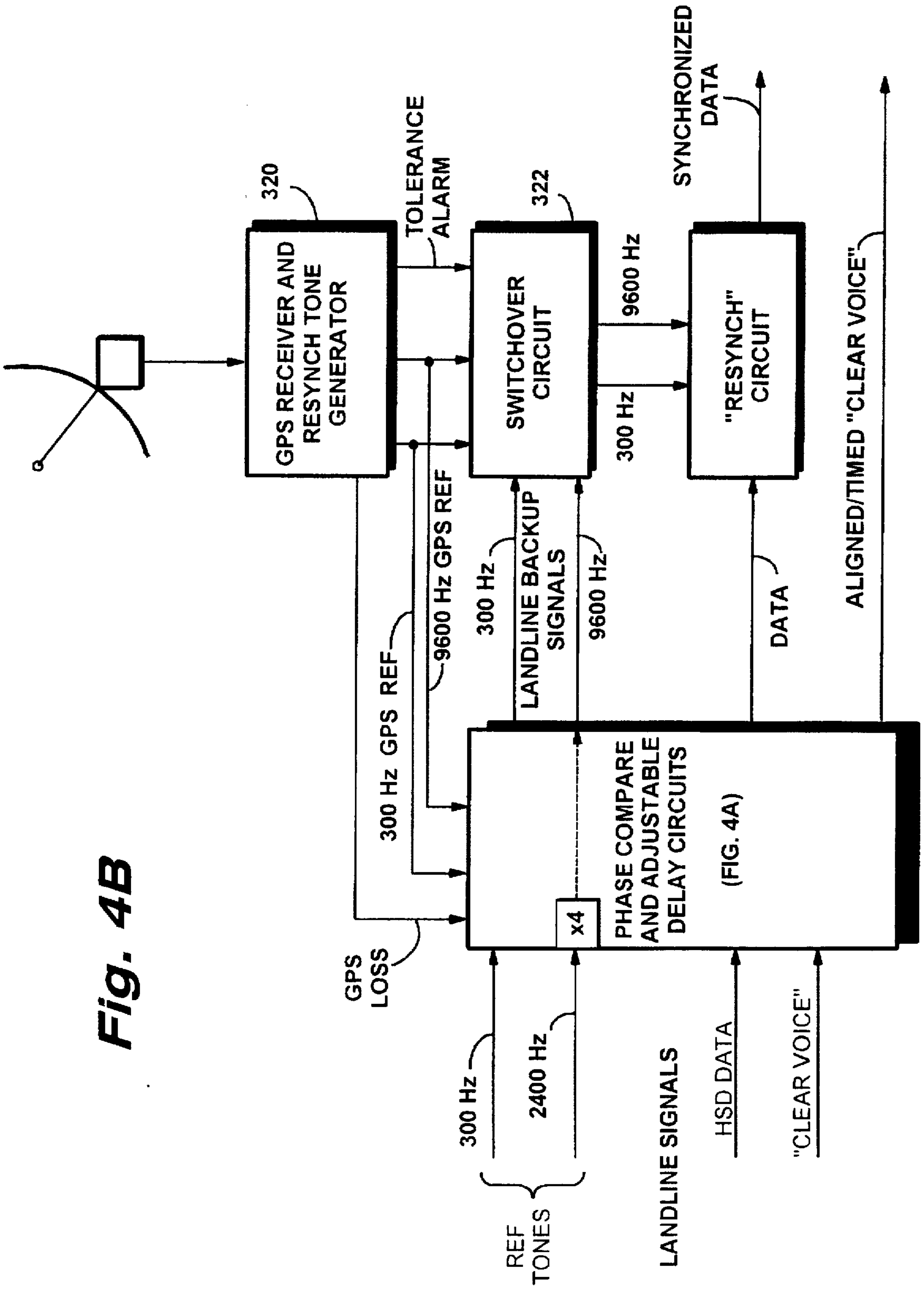
FIG. 4B is a block diagram illustrating an operating arrangement of the present invention for providing automatic alignment of "clear voice" and automatic switchover of the ReSynch circuit to land-line T1-channel backup tones.

Referring finally to FIG. 4B, the criteria and mechanism for disabling delay adjustment as well as the subsequent switch-over to land-line backup signals is the same as described above with respect to FIGS. 3A and 3B. Since the entire T1 data stream is delayed, the "clear voice" signal is automatically (inherently) adjusted at the same time to the "correct" amount of delay within the predetermined chosen tolerance.

Consequently, the above-described land-line signal delay and alignment methods and apparatus in accordance with the present invention are automatically set and automatically dynamically adjusted when necessary and, moreover, can replace the conventional analog (and digital) "bulk" delay mechanisms found in prior art simulcast systems.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a radio frequency (RF) simulcasting system of the type having a control point connected by land-line communication links to plural RF transmitter sites, said communication links exhibiting time delay ambiguities, and each of said RF transmitter sites including an associated global positioning satellite (GPS) receiver for providing access to a common timing reference, a method for maintaining simulcast system synchronization in the event of GPS receiver failure or loss of GPS signal lock, comprising the steps of:

generating a pair of backup simulcast system timing reference signal tones at said control point;

continuously transmitting said backup reference signal tones over said communication links to said transmitter sites; and using said backup reference tones at each transmitter site as an alternate common timing reference in the event of GPS receiver failure or loss of GPS signal lock.

2. The method for maintaining simulcast system synchronization of claim 1 including a step of deriving a pair of reference signal tones locally at a transmitter site using a received GPS broadcast and aligning said pair of backup simulcast system reference signal tones received at each transmitter site via said land-line communication link to the pair of GPS broadcast derived timing reference tones.

3. The method of claim 2 wherein the aligning step includes comparing said pair of backup reference tones to said GPS timing reference tones and respectively delaying each backup reference signal in accordance with the degree of phase difference between said signals and the GPS references.

4. The method of claim 2 wherein said aligning step is performed automatically and dynamically by a variable delay means responsive to a phase comparing means.

5. The method for maintaining simulcast system synchronization of claim 2 wherein the pair of GPS derived reference signal tones comprise a 300 Hz signal and a 2400 Hz signal.

6. The method for maintaining simulcast system synchronization of claim 1 wherein said backup reference signal tones are transmitted over said communication links via a separate dedicated T1-type channel to each transmitter site.

7. In a simulcasting radio frequency (RF) communications system of the type having a control point providing analog voice data signals and high speed digital data signals to plural RF transmitter sites via dedicated communication links, said data signals received at each said transmitter site exhibiting time ambiguities with respect to said data signals received at another said transmitter site, each of said RF transmitter sites including an associated global positioning satellite (GPS) receiver for providing access to a common GPS signal timing reference, and each of said RF transmitter sites receiving a pair of backup simulcast system timing reference signals via said communication links as an alternate common timing reference in the event of GPS receiver failure or loss of GPS signal lock, a method for maintaining automatic alignment of backup reference signals received at said RF transmitter sites and synchronizing RF simulcast transmissions to said backup reference signals in the event of GPS receiver failure or loss of GPS signal lock, comprising the steps of:

a) continuously comparing said backup reference signals received at an RF transmitter site to said GPS timing reference at said RF transmitter site to determine a phase difference;

b) delaying said received backup reference signals in response to said phase difference; and, c) in the event of GPS receiver failure or loss of GPS signal lock, using said backup reference signals to provide simulcast synchronization at said transmitter site.

8. The method of claim 7 wherein the use of backup reference signals in step c) to provide simulcast synchronization in the event of GPS receiver failure or loss of GPS signal lock, occurs after the expiration of a predetermined period of time.

9. In a simulcasting radio frequency (RF) communications system of the type having a control point providing analog voice data signals and high speed digital data signals to plural RF transmitter sites via dedicated communication links, said data signals received at each said transmitter site exhibiting time ambiguities with respect to said data signals received at another said transmitter site, each of said RF transmitter sites including an associated global positioning satellite (GPS) receiver for providing access to a common GPS signal timing reference, each of said sites including at least one site generated simulcast reference signal synchronized to said GPS signal to provide synchronization of RF simulcast transmissions from said sites, and each of said RF transmitter sites receiving a pair of backup simulcast system timing reference signals via said communication links as an alternate common timing reference in the event of GPS receiver failure or loss of GPS signal lock, each of said RF transmitter sites further including an apparatus for automatically aligning analog voice data signals for coherently simulcasting over a common RF channel, said apparatus comprising:

a T1-channel signal variable delay circuit;

a first comparator circuit coupled to said delay circuit;

a second comparator circuit coupled to said delay circuit, said first and second comparator circuits providing respective outputs indicative of phase differences between said pair of backup simulcast system timing reference signals and said common timing reference; and a delay circuit control signal generator for generating and controlling said variable delay circuit to provide course and fine amounts of delay to said T1-channel signal in response to said phase difference outputs from said first and second phase comparator circuits.

10. In a simulcasting radio frequency (RF) communications system of the type having a control point providing analog voice data signals and high speed digital data signals to plural RF transmitter sites via a dedicated phase-stable T1-channel over land-line communication links, said data signals received at each said transmitter site exhibiting various time latencies and timing ambiguities, each of said RF transmitter sites including an associated global positioning satellite (GPS) receiver for providing access to a common timing reference, and each of said RF transmitter sites receiving a pair of backup simulcast system timing reference signals via said phase-stable T1-channel over said communication links as an alternate common timing reference in the event of GPS receiver failure or loss of GPS signal lock, a method for automatically aligning said backup reference tones to match the analog voice signal path latency, comprising the steps of:

continuously comparing said backup reference signals received at an RF transmitter site to a GPS timing reference produced at said RF transmitter site;

delaying said T1-channel signal received at said transmitter site in response to a phase difference between said GPS timing reference and said backup reference signals received at said transmitter site.

11. In a simulcasting radio frequency (RF) communications system of the type having a control point providing analog voice data signals and high speed digital data signals to plural RF transmitter sites via dedicated communication links, said data signals received at each said transmitter site exhibiting time ambiguities with respect to said data signals received at another said transmitter site, each of said RF transmitter sites including an associated global positioning satellite (GPS) receiver for providing access to a common GPS signal timing reference, each of said sites including at least one locally generated simulcast reference signal synchronized to said GPS signal to provide synchronization of RF simulcast transmissions from said sites, and each of said RF transmitter sites receiving a pair of backup simulcast system timing reference signals via said communication links as an alternate common timing reference in the event of GPS receiver failure or loss of GPS signal lock, an apparatus for maintaining automatic alignment of backup reference signals received at said RF transmitter sites and synchronizing RF simulcast transmissions to said backup reference signals in the event of GPS receiver failure or loss of GPS signal lock, comprising:

a variable delay circuit;

a phase comparator circuit coupled to said delay circuit; and a switch-over circuit coupled to said variable delay circuit.

12. In a simulcasting radio frequency (RF) communications system of the type having a control point providing analog voice data signals and high speed digital data signals to plural RF transmitter sites via dedicated communication links, said data signals received at each said transmitter site exhibiting time ambiguities with respect to said data signals received at another said transmitter site, each of said RF transmitter sites including an associated global positioning satellite (GPS) receiver for providing access to a common timing reference, and each of said RF transmitter sites receiving a pair of backup simulcast system timing reference signals via said communication links as an alternate common timing reference in the event of GPS receiver failure or loss of GPS signal lock, each of said RF transmitter sites further including an apparatus for automatically aligning analog voice data signals for coherently simulcasting over a common RF channel, said apparatus comprising:

means for comparing and detecting phase differences between said simulcast system timing reference signals and said common timing reference; and, communication link signal delay means for variably delaying, in response to said detected phase differences, T1-type channel signals received via said dedicated links.

* * * * *